United States Patent [19]

Nakasaki et al.

[11] Patent Number: 4,971,357
[45] Date of Patent: Nov. 20, 1990

[54] MOUNT STRUCTURE FOR A SEAT-BELT RETRACTOR DEVICE

[75] Inventors: Syoichi Nakasaki; Hitoshi Haga, both of Saitama, Japan

[73] Assignee: Honda Giken Kogyo Kabushiki Kaisha, Tokyo, Japan

[21] Appl. No.: 365,991

[22] Filed: Jun. 14, 1989

[30] Foreign Application Priority Data

Jun. 17, 1988 [JP] Japan .................. 63-148188

[51] Int. Cl.⁵ .......................................... B60R 22/24
[52] U.S. Cl. ................................................... 280/801
[58] Field of Search ............... 280/801, 802, 803, 804, 280/808; 297/474, 475

[56] References Cited

U.S. PATENT DOCUMENTS

| | | | |
|---|---|---|---|
| 4,611,854 | 9/1986 | Pfeiffer | 280/801 |
| 4,672,730 | 6/1987 | Schrom et al. | 280/801 |
| 4,741,555 | 5/1988 | Frantom et al. | 280/801 |

FOREIGN PATENT DOCUMENTS 57-46  1/1982  Japan .

Primary Examiner—Richard A. Bertsch
Attorney, Agent, or Firm—Armstrong, Nikaido, Marmelstein, Kubovcik & Murray

[57] ABSTRACT

A retractor device for a seat-belt that is provided at a joining portion between a side sill and a center pillar in a motorcar. In the side sill, a side sill outer and a side sill inner are welded together at least along their upper portions to form a closed loop cross-section. This side sill is provided with a stiffener and a retractor device is mounted to the stiffener. The stiffener comprises a base portion extending along a side wall portion and a bottom portion of the side sill inner and provided with an aperture for inserting and mounting the retractor device therethrough, a side sill cross-section reinforcement portion connecting the side wall portion with the bottom portion, and an extension portion extending upwards from the gap between the side sill outer and the side sill inner in the top welded portion of said side sill and welded with the center pillar.

6 Claims, 4 Drawing Sheets

FIG. I

PRIOR ART

MOUNT STRUCTURE FOR A SEAT-BELT RETRACTOR DEVICE

BACKGROUND OF THE INVENTION

1. Field of the Invention:

The present invention relates to a structure for simultaneously achieving reinforcement of a lower portion of a center pillar as well as a cross-section of a side sill and mounting of a seat-belt retractor device (an emergency-locking seat-belt take-up device) in a motorcar.

2. Description of the Prior Art:

A seat-belt retractor device has been heretofore known, which operates in such manner that when an acceleration force exceeding a predetermined magnitude is exerted upon a vehicle body or a seat-belt is going to be pulled out quickly, the device prevents the seat-belt from being pulled out by stopping rotation of a drum around which the seat-belt is wound, thus holds a rider wearing the seat-belt and insures safety of the rider. However, if this retractor device is exposed in a car cabin, there is an inconvenience that the wall surface of the car cabin is uneven, hence beautiful appearance of the car cabin is deteriorated, and also the space of the car cabin becomes narrow.

In order to avoid this shortcoming, in the prior art, as shown in FIG. 1 (See Japanese Utility Model Publication No. 57-46) an aperture 03 was formed in an inside wall portion 02 of a side sill 01, a retractor device 04 was inserted into the side sill 01 through this opening 03, and the retractor device 04 was mounted to the inside wall portion 02 by means of bolts 05.

However, since the side sill 01 is a structural member extending in the back and forth direction of a vehicle body for bearing a vertical load and a bending moment, if the aperture 03 is opened in its inside wall portion 02, a bending rigidity and a bending strength of the side sill 01, and accordingly, of the vehicle body would be degraded, hence in order to deal with this problem it is necessary to increase a sheet thickness of the side sill 01, and increase of the weight of the vehicle body and rise of a cost are inevitable.

Especially, with regard to a front seat of a passenger car where a driver sits, since in many cases a retractor device of a seat-belt is mounted to the position at the bottom of the center piller where a bending moment is largest, the above-mentioned disadvantage is remarkable.

In order to avoid such increase of a sheet thickness of the side sill, as shown in FIG. 2, in addition to a retractor device mounting member 04, center pillar reinforcement members 06 and side sill reinforcement members 07 are necessitated, resulting in increase of a number of parts and a man-hour for assembly, and this also causes rise of a cost.

SUMMARY OF THE INVENTION

It is therefore one object of the present invention to provide an improved mount structure for a seat-belt retractor device which is free from the above-described shortcomings of the mount structure in the prior art.

According to one feature of the present invention, there is provided a mount structure for a seat-belt retractor device for mounting a retractor device of a seat-belt to a joining portion between a center pillar and a side sill having a closed loop cross-section formed therein by welding a side sill outer and a side sill inner at least along their top edges, in which a stiffener to which the retractor device is to be mounted consists of a base portion extending along a side wall portion on the side of the side sill inner and a bottom portion of the side sill and provided with an aperture for inserting and mounting the retractor device therethrough, a side sill cross-section reinforcement portion connecting the side wall portion with the bottom portion, and an extension portion extending upwards from the gap between the side sill outer and the side sill inner in the top welded portion of the side sill and welded with the center pillar.

According to the present invention, owing to the fact that a base portion extending along an inner side side wall portion and a bottom portion of a side sill and provided with an aperture for inserting and mounting a retractor device therethrough is formed in one part of a stiffener to which the retractor device is to be mounted, the retractor device can be disposed within the side sill, and also the side sill in the proximity of the retractor device can be reinforced.

In addition, according to the present invention, owing to the fact that the above-mentioned stiffener is formed of a side sill cross-section reinforcement portion connecting the inner side side wall portion and the bottom portion of the aforementioned side sill and an extension portion extending upwards from the gap between the side sill outer and the side sill inner in the top welded portion of the aforementioned side sill and welded to the center pillar, the above-mentioned side sill can be given sufficient rigidity and strength for bearing against a load tending to deform a transverse cross-section shape of the aforementioned side sill, and also, a bending rigidity and a bending strength of the side sill in the proximity of the center pillar applied with a large bending moment can be increased.

The above-mentioned and other objects, features and advantages of the present invention will become more apparent by reference to the following description of one preferred embodiment of the invention taken in conjunction with the accompanying drawings.

DESCRIPTION OF THE PREFERRED EMBODIMENT

In the following, description will be made on one preferred embodiment of the present invention as applied to a passenger car illustrated in FIGS. 3 to 6.

A seat-belt 1 is provided for protecting a rider sitting on a front seat positioned in front of a center pillar 21 but not shown, and a retractor device 2 which takes up this seat-belt 1 so as to be freely pulled out and taken up, is adapted to prevent a seat-belt 1 from being pulled out in the event that an acceleration force exceeding a predetermined magnitude is exerted upon a vehicle body 10 or in the case where a rider is made to fall forwards by an inertial force upon collision and the seat-belt tends to be pulled out quickly.

Figure 1:
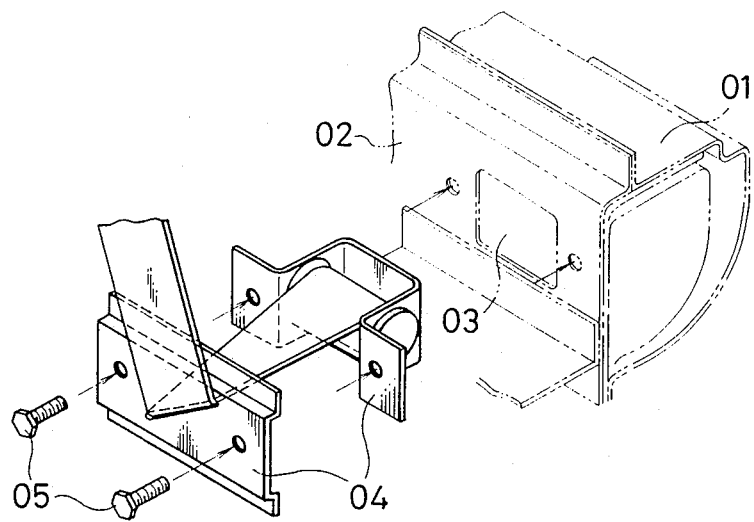
FIG. 1 is a disintegrated perspective view showing a mounting state of a retractor device in the prior art.
Figure 2:
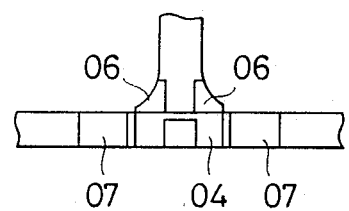
FIG. 2 is a side view showing arrangement of side sill reinforcement members to be used for mounting a retractor device.
Figure 3:
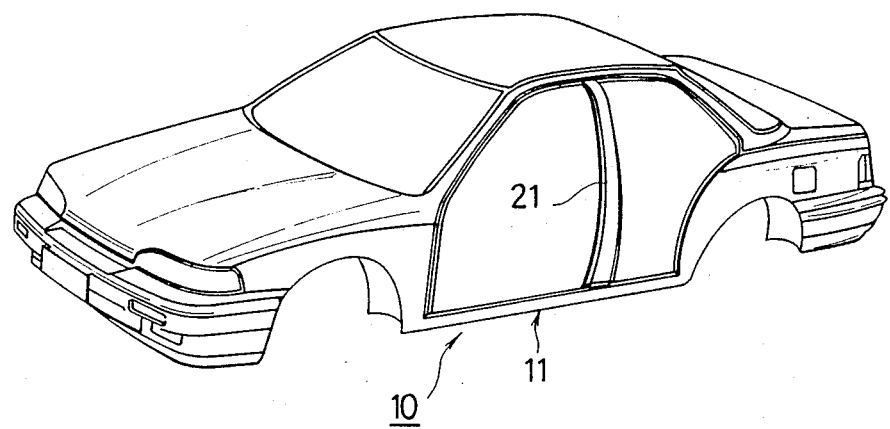
FIG. 3 is a perspective view of a passenger car body to which the mount structure for a seat-belt retractor device according to the present invention is applicable.
Figure 4:
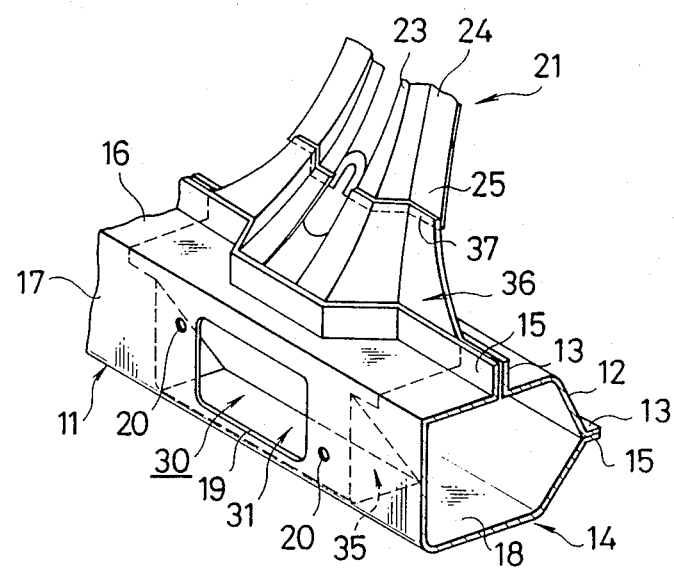
FIG. 4 is an enlarged perspective view of an essential part of the car body in FIG. 3.
Figure 5:
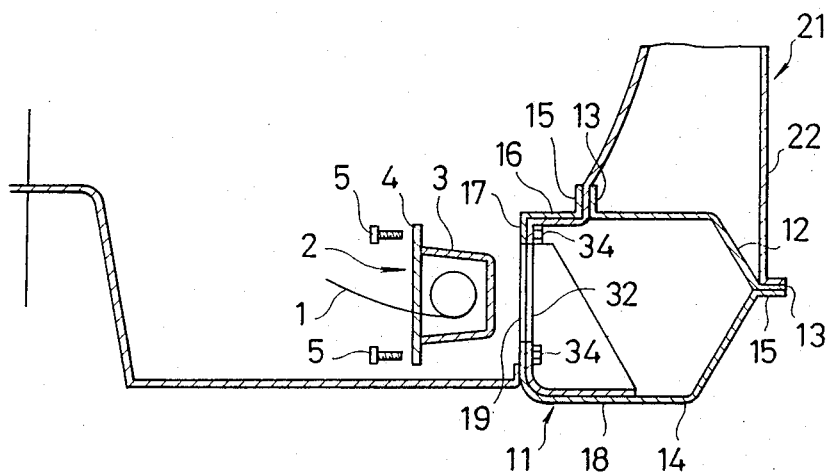
FIG. 5 is a transverse cross-section view of the structure shown, in FIG. 4.
Figure 6:
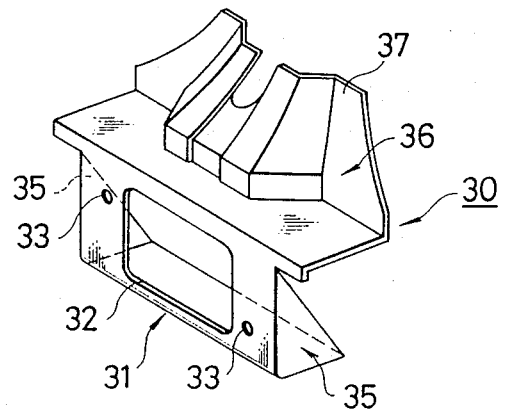
FIG. 6 is a perspective view of a stiffener used in the structure shown in FIG. 5.

FIG. 3 is a perspective view illustrating a vehicle body 10 of a passenger car to which the present invention is applicable, in which each of side sills 11 positioned on the respective sides of the lower portion of the vehicle body 10 consists of a side sill outer 12 and a side sill inner 14, the respective flange portions 13 and 15 of the side sill outer 12 and the side sill inner 14 are superposed on and welded with each other, thereby the side sill 11 is formed in a hollow shape, and a rectangular aperture 19 for mounting a retractor device 2 to a side wall portion 17 is provided as positioned right under a center pillar 21. In addition, small circular holes 20 for passing fastening bolts 5 (FIG. 5) are formed at two locations adjacent to diagonally opposed corners of the rectangular aperture 19.

The center pillar 21 also consits of an outer panel 22 and an inner panel 23, the flange portions (not shown) of the outer panel 22 and the inner panel 23 are also superposed on and welded with each other, and thereby the center pillar 21 is also formed in a hollow shape.

Futhermore, a stiffener 30 is formed in such manner that it can be held in tight contact with a lower surface of a top wall portion 16 of the side sill inner 14 positioned under the center pillar 21, an inner surface (a right side surface as viewed in FIGS. 4 and 5) of a side wall portion 17 thereof, and an upper surface portion closer to the center of the vehicle body of a bottom wall portion 18 thereof. It consists of a base portion 31 provided with an aperture 32 of the same shape as the aperture 19 and small circular holes 33 aligning with the small circular holes 20, side sill cross-section reinforcement portions 35 integrally filet-welded with the both front and rear side edges of the base portion 31 as directed nearly at right angles to the base portion 31 towards the outside of the vehicle body, and an extension portion 36 pinched between the joining sections of the upper flanged portions 13 and 15 of the side sill outer 12 and the side sill inner 14 and forming a lower part of the inner panel 23 of the center piller 21. A top end portion 37 of this extension portion 36 is adapted to be integrally welded with a bottom end portion 25 of the inner panel 23. In addition, on the inside of the small circular holes 33 are integrally provided female screw portions 34.

Since the preferred embodiment illustrated in FIGS. 3 to 6 is constructed in the above-described manner, under the condition that the aperture 32 of the stiffener 30 is aligned with the aperture 19 of the side sill 11 and the base portion 31 of the stiffener 30 is held in contact with the lower surface of the top wall portion 16 of the side sill inner 14, the inner surface of the side wall portion 17 and the upper surface portion closer to the center of the vehicle body of the bottom wall portion 18, if welding is effected at the joining portions between the edges of the base portion 31 as well as the edges of the side sill cross-section reinforcement portion 35 and the inner surface of the side sill inner 14, and further if welding is effected at the joining portion between the flange portion 13 of the side sill outer 12 and the flange portion 15 of the side sill inner 14, then the side sill 11 can be constructed.

Subsequently, the bottom end portion 25 of the inner panel 23 of the center pillar 21 is superposed on the top end portion 37 of the extension portion 36 projecting upwards from the joined portions of the flange portions 13 and 15 of the side sill 11, welding is carried out along the superposed portions, and welding is carried out so as to integrally join a flange portion (not shown) of the outer panel 22 and a flange portion 24 of the inner panel 23. Then, the center pillar 21 can be integrally connected with the side sill 11.

Since the aperture 32 of the stiffener 30 is positioned so as to align with the aperture 19 of the side sill 11, a main body 3 of the retractor device 2 is inserted through these apertures 19 and 32 into the space within the side sill 11, a flange portion 4 of the device is superposed on the outer surface of the side wall portion 17 of the side sill inner, then tip ends of bolts 5 penetrating through small circular holes in the flange portion 4, the small circular holes 20 in the side sill inner 14 and the small circular holes 33 in the stiffener 30 are threadedly engaged with the female screws 34, and thereby the retractor device 2 can be mounted integrally with the side sill 11 via the base portion 31 of the stiffener 30 without being exposed to the car cabin space.

As the base portion 31 of the stiffener 30 is integrally and fixedly secured to the side sill inner 14 in the proximity of the aperture 19, the portion of the side sill inner 14 in the proximity of the aperture 19 is sufficiently reinforced and rigidified.

Moreover, since the outer edge of the side sill cross-section reinforcement portion 35 of the stiffener 30 is integrally joined with the inner surface of the side sill 11 positioned right under the center pillar 21, the cross-section of the hollow side sill 11 is firmly reinforced and rigidified by the side sill cross-section reinforcement portion 35.

Furthermore, although stress is liable to be concentrated at the lower portion of the center pillar 21, as the bottom end portion of the inner panel 24 of the center pillar 21 is superposed on the top end portion 37 of the extension portion 36 of the stiffener 30 in double layers and they are joined together, the stress concentration at the lower portion of the center pillar 21 can be avoided, and a strength and a rigidity of the joined portions between the side sill 11 and the center pillar 21 can be improved.

As described in detail above, according to the present invention, owing to the fact that a stiffener for mounting a retractor device is constructed of the base portion, the side sill reinforcement portion and the extension portion, a strength and a rigidity of a side sill in the proximity of a center pillar can be sufficiently increased while avoiding increase of a number of parts and a man-hour for assembly, and a great reduction of a cost can be achieved without being accompanied by increase of a vehicle body weight.

While a principle of the present invention has been described above in connection to one preferred embodiment of the invention, it is intended that all matter described in the specification and illustrated in the accompanying drawings shall be interpreted to be illustrative and not in a limiting sense.

What is claimed is:

1. A mount structure for a seat-belt retractor device for mounting a retractor device of a seat-belt to a joining portion between a center pillar and a side sill having a closed loop cross-section formed therein by welding a side sill outer and a side sill inner at least along their top edges; characterized in that an integral stiffener to which the retractor device is to be mounted comprises a base portion, said base portion being defined by a side wall portion of said base portion and a bottom portion of said base portion, said base portion extending along a side wall portion of the side sill inner and a bottom portion of the side sill inner and provided with an aperture for inserting and mounting the retractor device therethrough, said integral stiffener further comprising a side sill cross-section reinforcement portion connecting the side wall portion of said base portion with the bottom portion of said base portion, and an extension portion extending upwards from the gap between the side will outer and the side sill inner in the top welded portion of the side sill and welded with the center pillar.

2. A mount structure as claimed in claim 1, wherein said center pillar is formed of an outer panel and an inner panel into a hollow shape, and said extension portion is welded with said inner panel.

3. A mount structure as claimed in claim 1, wherein said base portion is provided with a top wall portion extending along the lower surface of the top wall portion of said side sill inner.

4. A mount structure as claimed in claim 1, wherein said side sill cross-section reinforcement portions are provided respectively at the both front and rear ends of said base portion and integrally filet-welded with the side wall portion and the bottom wall portion of said base portion as directed nearly at right angles thereto.

5. A mount structure as claimed in any one of claims 1, 3 or 4, wherein the edges of said stiffener are welded with the inner surface of said side sill inner.

6. A mount structure as claimed in claim 1, wherein said side sill outer and said side sill inner are welded to each other along flanges joined together along a top portion of said side sill and along an outer and an outer portion of said side sill.

* * * * *